United States Patent [19]

Revell

[11] 4,326,866
[45] Apr. 27, 1982

[54] DISCHARGE APPARATUS FOR REMOVING GRANULAR FILTER MATERIAL FROM A FILTER HOUSING AND A FILTER APPARATUS HAVING SAME

[75] Inventor: Alan Revell, Louisville, Ky.

[73] Assignee: American Air Filter Company, Inc., Louisville, Ky.

[21] Appl. No.: 106,750

[22] Filed: Dec. 26, 1979

[51] Int. Cl.³ .............................................. B01D 46/30
[52] U.S. Cl. ....................................... 55/479; 55/484; 406/191
[58] Field of Search ................. 55/431, 474, 479, 484, 55/518; 406/45, 84, 145, 191

[56] References Cited

U.S. PATENT DOCUMENTS

| | | | |
|---|---|---|---|
| 133,984 | 12/1872 | Hawkes et al. | 55/431 |
| 3,194,420 | 7/1965 | Kemp et al. | 406/145 |
| 3,215,473 | 11/1965 | Kemp et al. | 406/145 |
| 3,246,805 | 4/1966 | Kemp | 406/145 |
| 3,554,609 | 1/1971 | Rollins | 406/145 |
| 3,778,114 | 12/1973 | Carney, Jr. et al. | 406/145 |
| 3,795,090 | 3/1974 | Barnebey | 55/479 |
| 3,797,891 | 3/1974 | Fritz | 406/145 |
| 3,964,890 | 6/1976 | Bonn | 55/431 |
| 4,127,397 | 11/1978 | O'Nan, Jr. et al. | 55/431 |

FOREIGN PATENT DOCUMENTS

| | | | |
|---|---|---|---|
| 772047 | 10/1934 | France | 55/431 |
| 17313 | 7/1911 | United Kingdom | 55/431 |

Primary Examiner—David L. Lacey
Attorney, Agent, or Firm—Thomas G. Anderson

[57] ABSTRACT

A filter apparatus includes a filter housing having a gas treating enclosure portion and a hopper portion disposed below and open to the gas treating enclosure portion. The gas treating enclosure portion encloses a plurality of spaced apart filter cells which are to be filled with granulated gas treating material. The filter cells have open bottoms open to the hopper portion. A gas treating material conveying channel is disposed within and extends across the hopper portion of the housing proximate the bottom thereof. The interior of the channel is open to the interior of the hopper portion only intermittently along the longitudinal sides of the channel. Further, a conveying gas inlet aperture is formed through one wall of the hopper portion opening into the channel at one of its ends, and a gas treating material and conveying gas outlet aperture is formed through the opposite wall of the hopper portion opening into the channel at the other of its ends.

7 Claims, 18 Drawing Figures

DISCHARGE APPARATUS FOR REMOVING GRANULAR FILTER MATERIAL FROM A FILTER HOUSING AND A FILTER APPARATUS HAVING SAME

BACKGROUND OF THE INVENTION

The present invention pertains to gas separation, and more particularly to gas separation devices using a granular solid sorbent for a vaporous or gaseous constituent and especially to devices for removing granulates solid sorbent from a gas separation device.

In gas separation devices, particularly those used in the nuclear field to remove radioactive constituents from a gas stream, it is necessary to, from time to time, remove the radioactive granular solid sorbent material from the gas separation device prior to recharging the gas separation device with fresh uncontaminated granular solid sorbent material. It is not only important that all of the radioactive granular solid material be removed, but also that it be removed without contaminating the ambient atmosphere, or equipment and personnel which may be nearby. An additional consideration is that the contaminated radioactive granular solid sorbent material be rapidly removed in order to reduce expensive down time of the gas separator device.

Various discharge apparatus for removing a granular solid sorbent material from a filter housing are known. Exemplary of these various discharge apparatus are U.S. Pat. Nos. 2,796,237 issued to F. Nettel on June 18, 1957; 2,911,036 issued to M. E. Lazar et al on Nov. 3, 1959; 3,212,240 issued to C. M. Streete on Oct. 19, 1965; 3,716,969 issued to Isamu Maeda on Feb. 20, 1973; 3,815,335 issued to H. L. Barneby on June 11, 1974; 3,925,046 issued to T. N. Hickey et al on Dec. 9, 1975; and 3,964,890 issued to J. W. Bonn on June 22, 1976.

SUMMARY OF THE INVENTION

The present invention recognizes these requirements and provides a discharge apparatus for removing a granular solid sorbent gas treating material from the interior of a filter housing which fulfills these requirements and further which is straightforward, and inexpensive to make and maintain in service.

More particularly, the present invention provides a discharge apparatus for removing a granular solid sorbent gas treating material from the interior of a filter housing, the discharge apparatus comprising:

a discharge apparatus for removing a granular gas treating material from the interior of a filter housing, the discharge apparatus comprising:

channel defining means defining a gas treating material conveying channel disposed within and extending across the filter housing proximate the bottom thereof, the gas treating material conveying channel being open to the interior of the filter housing only at spaced intervals along the length of gas treating material conveying the channel;

means defining a conveying gas inlet aperture through one wall of the filter housing gas treating material conveying into the channel at one end of the gas treating material conveying channel and, means defining a gas treating material and conveying gas outlet aperture from the gas treating material conveying channel through the filter housing wall at the opposite end of the gas treating material conveying channel.

In addition, the present invention provides a filter apparatus comprising:
(a) a filter housing comprising:
  (1) a gas treating enclosure portion having at least one dirty gas inlet aperture formed in one of its walls and at least one clean gas outlet aperture formed in at least one of its walls; and,
  (2) a hopper portion disposed below and open to the gas treating portion having at least two facing walls sloping downwardly toward each other;
(b) means defining a plurality of filter cells to be filled with a granulated gas treating material, disposed within the gas treating enclosure portion of the filter housing, and the filter cell defining means being open to the hopper portion of the filter housing so that when the filter cell defining means are filled with granulated gas treating material, granulated gas treating material will fall into the hopper portion of the filter housing;
(c) means cooperating with the sloping walls of the hopper portions to define a gas treating material conveying channel within and extending completely across the hopper portion of the filter housing proximate the bottom thereof, the gas treating material conveying channel being open to the interior of the hopper portion of the housing only at intervals along the longitudinal sides of the gas treating material conveying channel;
(d) means defining a conveying gas inlet aperture through one wall of the hopper portion of the filter housing into the gas treating material conveying channel at one end of the channel; and,
(e) a gas outlet aperture for the conveying gas and the gas filtering material opening into the conveying channel through the wall of the hopper portion of the filter housing at the opposite end of the conveying channel.

BRIEF DESCRIPTION OF THE DRAWINGS

The description herein makes reference to the accompanying drawings wherein like numerals refer to like parts throughout, and in which.

DETAILED DESCRIPTION

Figure 1:
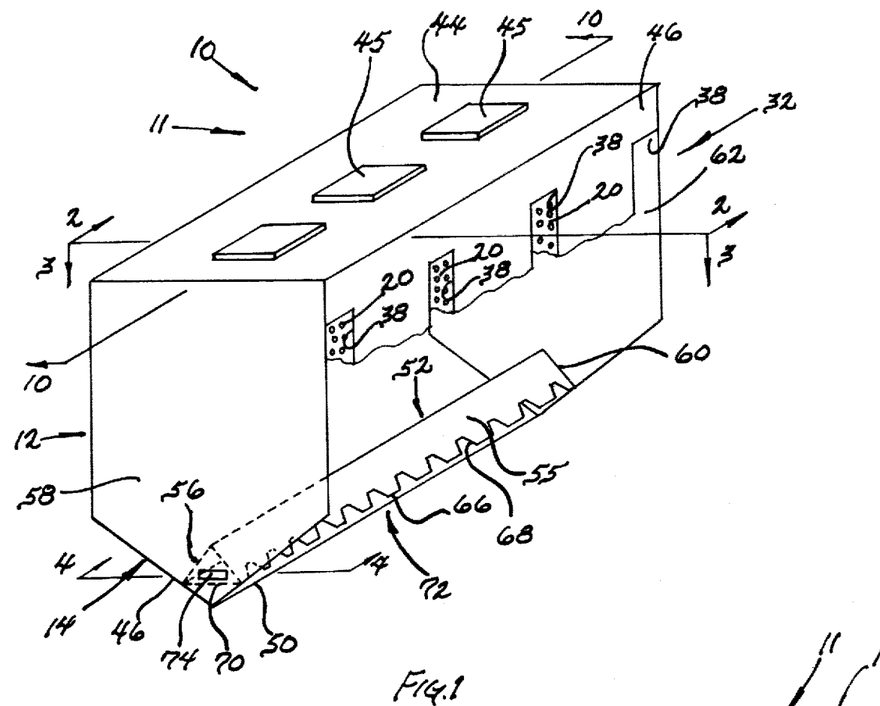
FIG. 1 is an isometric, partially broken away view of a filter device incorporating the present invention.
Figure 2:
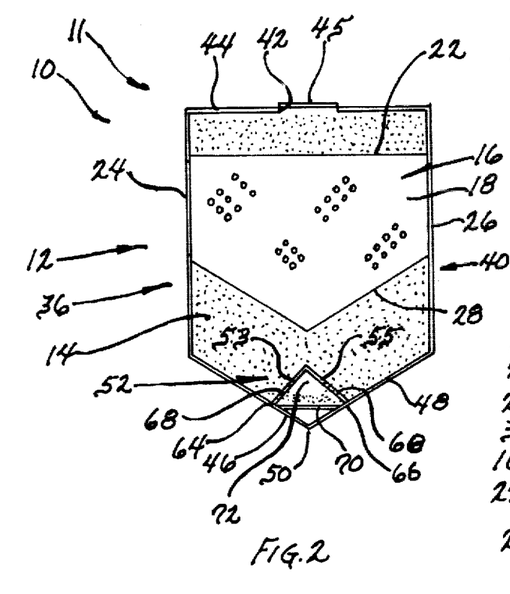
FIG. 2 is a transverse cross-sectional view taken in the direction of arrows 2—2 in FIG. 1.
Figure 3:
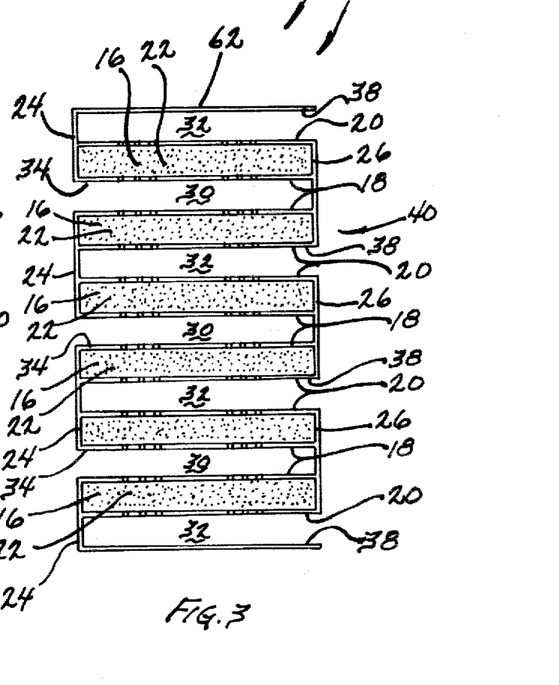
FIG. 3 is a horizontal cross-sectional view taken in the direction of arrows 3—3 in FIG. 1.

FIGS. 1-3 shows a rechargeable gas filter apparatus 10 which is particularly suitable for use in the nuclear field for removing radioactive constituents from a gas stream. The filter apparatus 10 comprises a housing 11 with an upper gas treating enclosure portion 12 and a lower hopper portion 14 open to the gas treating enclosure portion 12.

A plurality of spaced apart filter cells 16 are disposed within the upper gas treating enclosure portion 12. Each filter cell 16 comprises spaced apart parallel planar foraminous front and back walls 18 and 20, respectively, an open top face 22, closed end surfaces 24 and 26, and an open bottom face 28. The filter cells are vertically disposed within the gas treating enclosure portion 12 with the foraminous front and back walls 18, 20 or each filter cell being spaced from and parallel to adjacently disposed filter cells and the open bottom faces 28 of each filter cell facing toward and open to the hopper portion 14 of the filter apparatus 10. A plurality of alternating dirty gas inlet passageways 30 and clean gas inlet passageways 32 are defined between the spaced apart filter cells 16.

The gas treating enclosure portion 12 of the gas filter apparatus 10 further comprises a plurality of dirty gas inlet apertures 34 formed in its upstream wall 36, each dirty gas inlet aperture 34 communicating with a different one of the dirty gas inlet passageways 30. Likewise, a plurality of clean gas outlet apertures 38 are formed in the downstream wall 40 of the gas treating enclosure portion 12, each clean gas outlet aperture 38 communicating with a different one of the clean gas outlet passageways 32.

Means for charging the filter cells 16 with uncontaminated granulated solid sorbent gas treating material, much as a granulated charcoal or activated carbon sorbent, may be situated in the gas treating enclosure portion 12 of the filter apparatus 10. Such a charging means is illustrated, for exemplary purposes, in the figures as a plurality of openings 42 in the top wall 44 of the gas treating enclosure portion 12. Each opening 42 can be closed by a cover 45 secured in place by virtually any one of a number of conventional means. Any one of a number of granulated solid sorbent charging means can be used. However, because the charging means does not comprise any part of the present invention, it will not be further discussed herein.

With continued reference to FIGS. 1 and 2, the hopper portion 14 of the filter apparatus 10 has at least two of its facing walls 46 and 48 sloping downwardly toward each other and intersecting each other at their depending edges, generally denoted at the numeral 50, thus, defining a V-shaped configuration in transverse cross-section. Because the hopper portion 14 is below and open to the gas treating enclosure portion 12 and together the hopper portion 14 and gas treating enclosure portion 12 comprise the filter housing, the sloping walls 46 and 48 constitute the floor of the housing 11. The V-shaped hopper portion 14 is symmetrically disposed relative to the gas treating enclosure portion 12. Preferably, the sloping wall 46 is the wall of the hopper portion 14 which is adjacent the upstream wall 36 of the gas treating enclosure portion 12 and the sloping wall 48 is the wall of the hopper portion 14 which is adjacent the downstream wall 40 of the gas treating enclosure portion 12 so that the intersection of the sloping walls 46, 48 is oriented transverse to the planar foraminous front and back walls 18 and 20 of the filter cells 16.

Figure 4:
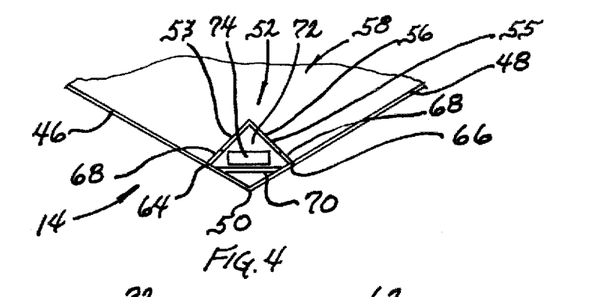
FIG. 4 is an enlarged segmented end view taken in the direction of arrows 4—4 in FIG. 1.
Figure 5:
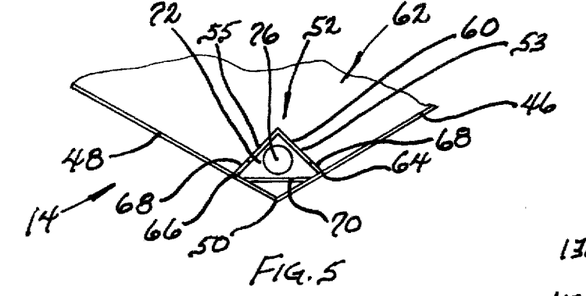
FIG. 5 is an enlarged segmented end view taken in the direction of arrows 5—5 in FIG. 1.

With continued reference to FIGS. 1 and 2 and additionally to FIGS. 4 and 5, channel defining means such as an elongated baffle plate 52 is disposed within the hopper portion 14 and cooperates with the sloping walls 46, 48 of the hopper portion 14 to define a gas treating material conveying channel 72, the longitudinal axis of which is parallel to the intersection of the sloping walls 46,48. The baffle plate 52 preferably has a chevron shape in transverse cross-section formed of two longitudinal side walls 53 and 55 with the apex of the chevron in line with and projecting upwardly away from the intersection 50 of the sloping walls 46, 48. The included angle between the longitudinal walls 53 and 55 of the chevron shaped baffle plate is advantageously approximately 90°. The baffle plate 52 extends completely across the hopper portion 14 and is attached at one of its ends 56 to one side wall 58 of the housing 11 and at its other end 60 to the opposite side wall 62 of the housing 11. The longitudinal walls 53 and 55 of the baffle plate 52 terminate at longitudinal edges 64 and 66, respectively. These longitudinal edges 64 and 66 are generally parallel to each other. The longitudinal edge 64 of the longitudinal wall 53 abuts the sloping wall 46 of the hopper portion 14 and the longitudinal edge 66 of the longitudinal wall 55 abuts the sloping wall 48 of the hopper portion 14.

Each longitudinal wall 53 and 55 of the baffle plate 52 is formed with a plurality of notches 68 at intervals along the length of the elongated baffle plate 52. Preferably, each notch 68 formed in longitudinal wall 53 is open to the longitudinal edge 64 and, likewise, each notch 68 formed in the longitudinal wall 55 is open to the longitudinal edge 66. Thus, the gas treating material conveying channel 72 is open to, or communicates with the interior of the hopper portion 14 only at intervals along its length through the notches 68 formed in the elongated baffle plate 52.

The gas treating material conveying channel 72 has a planar floor 70 disposed in a substantially horizontal plane. The floor 70 can be formed by, for example, a flat elongated metal plate having its longitudinal edges in abuttment with the sloping walls 46,48 of the housing and its opposite end edges in abuttment with the filter housing opposite side walls 58 and 62, respectively. The flat elongated metal plate can be attached to the housing walls by virtually any conventional or otherwise convenient method such as, for example, welding. The purpose of the planar floor 70 is to provide a smooth flat surface over which the granulated solid sorbent material can readily slide with a minimum of friction as it moves along the channel 72. Of course, the horizontal floor 70 can be formed in other ways, for example, by bending the bottom portions of the sloping walls 46, 48 in a horizontal plane so that the bottom portions of these sloping walls 46, 48 themselves from the planar floor 70 of the gas treating material conveying channel 72.

Now with reference to FIGS. 1, 4 and 5, a conveying gas inlet aperture 74 is formed through the filter housing side wall 58 and opens into the gas treating material conveying channel 72 at one of the ends of the channel. Similarly, a gas treating material and conveying gas outlet aperture 76 is formed through the opposite filter housing side wall 62 and opens into the gas treating material conveying channel 72 at the opposite end of the channel 72 from the conveying gas inlet aperture 74.

The object of the discharge apparatus is to empty the hopper portion 14 of the filter apparatus 10 in the least possible time and without creating blockage of granulated solid sorbent gas treating material or voids in the mass of granulated solid sorbent gas treating material both of which result in a cessation of the emptying process. It has been determined that it is necessary that the emptying process begin at the end of the channel 72 proximate the conveying gas inlet aperture 74 the gas treating material conveying channel 72 and progress substantially uniformly along the gas treating material channel 72 to the opposite end of the channel 72 proximate the gas treating material and conveying gas outlet aperture 76. If, for example, the emptying process began at the channel 72 proximate the gas treating material and conveying gas outlet 76, or somewhere along the channel 72 between the conveying gas inlet aperture 74 and gas treating material and conveying gas outlet aperture 76 a void would be created in the granulated solid sorbent gas treating material and the emptying process would cease before the entire hopper portion 14 was emptied of granulated solid sorbent gas treating material. To this end, it is necessary to create a negative static pressure in the entire gas treating material conveying channel 72. However, if the negative static pressure is constant along the length of the channel 72 from the inlet aperture 74 to the outlet aperture 76, or if the negative static pressure is less somewhere along the channel 72 between the inlet aperture 74 and outlet aperture 76 than at the end of the channel 72 proximate the outlet aperture 76, or if the negative static pressure is less at the end of the channel 72 proximate the inlet aperture 74 than at the end of the channel 72 proximate the outlet aperture 76, or if the negative static pressure is greater somewhere along the length of the channel 72 between the inlet aperture 74 and outlet aperture 76 than at the end of the channel 72 proximate the inlet aperture 74, voids and blockages will occur in the mass of granulated solid sorbent gas treating material. Thus, it is necessary that the negative pressure progressively decrease in magnitude along the length of the channel 72 from a maximum at the end of channel 72 proximate the inlet aperture 74 to a minimum at the end of the channel 72 proximate the outlet aperture 76. Prior attempts to accomplish this result have consisted of using a gas treating material conveying channel formed with a continuous slot along the length of the channel 72 on opposite longitudinal sides of the channel through which to aspirate granulated solid sorbent gas treating material. This has not proved satisfactory in all applications as, for some reason, from time to time voids do result in the mass of granulated sorbent material gas treating material being removed, particularly somewhere along the length of the channel 72 between the inlet aperture 74 and outlet aperture 76. This phenomena seems to occur mainly in long channels 72, for example, in channels 72 which exceed 6 feet in length.

Tests were conducted with a gas treating material conveying channel having continuous slots to determine, under a particular operating parameters, at what channel length voids were created in the gas treating material being removed. Then, texts were conducted on a gas treating material conveying channel exceeding this length, and at the same operating parameters, but having spaced notches 68 instead of continuous longitudinal to determine if notches would have a different effect on the gas treating material flowing into and through the gas treating material conveying channel. Notches 68 equally spaced along the entire length of the gas treating material conveying channel did not seem to function much differently than continuous slots. However, notches 68 spaced at progressively greater intervals along the length of the channel 72 from the end of the channel 72 proximate the inlet aperture 74 toward the opposite end of the channel 72 proximate the outlet aperture 76 did advantageously affect the flow of gas treating material into and through the channel 72 compared to the channel having continuous longitudinal slots. That is, at extended channel lengths a progressively decreasing negative pressure was maintained in the channel 72 from the end of the channel 72 proximate the inlet aperture 74 to the opposite end of the channel 72 proximate the outlet aperture 76, thus, preventing the formation of voids in the gas treating material which occurred in extended length channels having continuous slots. The notches 68 somehow even out the decay of negative pressure from one end of the channel to the opposite end.

Tests were also conducted to determine if the peripheral shape of the notches have an effect on the flow of gas treating material into and through the channel 72. Three different peripheral shapes were tested: trapezoidal, triangular, and rectangular. These tests indicated that trapezoidal shaped notches performed better than triangular shaped notches, and triangular shaped notches performed better than rectangular shaped notches. Performance in this context is the rate at which the granulated solid sorbent gas treating material is emptied from the hopper portion 14 through the gas treating material conveying channel 72.

Figure 12:
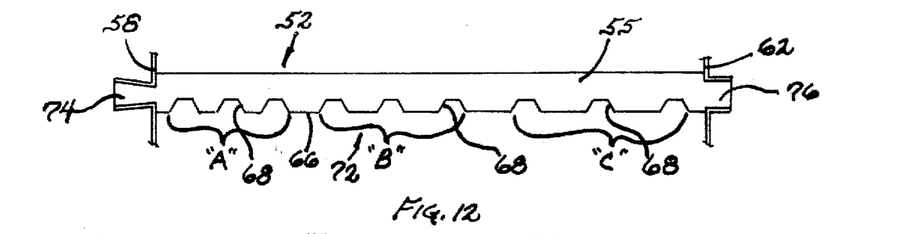
FIG. 12 is a longitudinal side view of the present invention shown in FIG. 11.

With reference to FIG. 12, one advantageous embodiment of the gas treating material conveying channel 72 of the present invention illustrates a plurality of spaced apart groups, denoted for example as "A", "B" and "C", of trapezoidally shaped notches 68 formed in the longitudinal wall 55 of the elongated baffle plate 52. It should be clearly understood that like notches are formed in the other longitudinal wall 53 of the elongated baffle plate and in alignment with corresponding notches formed in the longitudinal wall 55. This can be more clearly visualized in FIGS. 1, 6 and 11. The groups "A", "B" and "C" are spaced apart from one another at progressively greater intervals advancing along the length of the channel 72 from the end of the channel proximate the inlet aperture 74 to the opposite end of the channel proximate the outlet aperture 76. That is, the space between groups "A" and "B" is less than the space between groups "B" and "C". In each group the spacing between the notches 68 is equal, however, the spacing between the notches is progressively greater in each succeeding group advancing along the length of the channel 72 from the end of the channel proximate the inlet aperture 74 to the opposite end of the channel proximate the outlet aperture 76. That is the equal spacing between the notches 68 of group "A" is less than the equal spacing between the notches 68 of group "B", and the equal spacing between the notches 68 of the group "B" is less than the equal spacing between the notches 68 of group "C".

Figure 13:
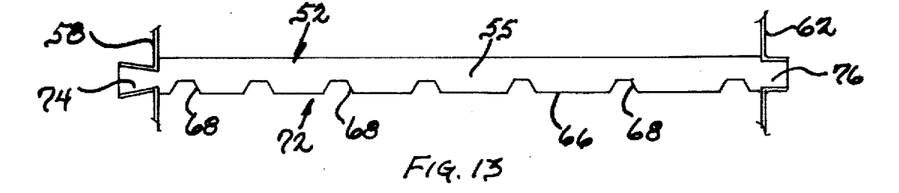
FIG. 13 is a longitudinal side view of another advantageous embodiment of the present invention.

With reference to FIG. 13, another advantageous embodiment of the gas treating material conveying channel 72 of the present invention comprise a plurality of trapezoidally shaped notches 68 formed in each longitudinal wall 53 and 55 of the elongated baffle plate 52. The notches of each wall 53 and 55 are spaced apart from one another at progressively increasing intervals along the length of the channel 72 from the end of the channel proximate the inlet aperture 74 to the other end of the channel proximate the outlet aperture 76. The notches 68 formed in the wall 53 are in alignment with corresponding notches 68 formed in wall 55.

Figure 14:
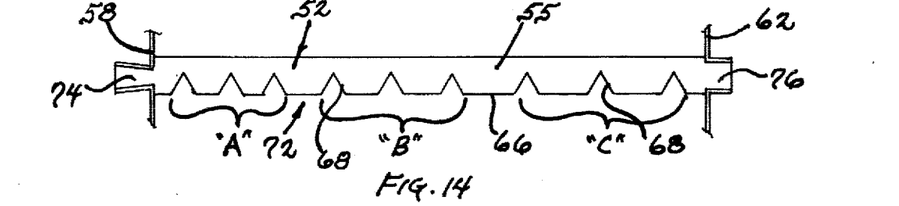
FIG. 14 is a longitudinal side view of yet another advantageous embodiment of the present invention.

Referring now to FIG. 14, yet another advantageous embodiment of the gas treating material conveying channel 72, resembling the advantageous embodiment of FIG. 12, comprises a plurality of spaced apart groups, denoted for example as "A", "B" and "C", of triangular shaped notches 68' formed in the longitudinal wall 55 of the elongated baffle plate 52. It should be clearly understood that like notches 68' are formed in the other longitudinal wall 53 of the elongated baffle plate in alignment with corresponding notches formed in the longitudinal wall 55. This can be more clearly visualized by reference to FIGS. 1, 6 and 11. The groups "A", "B" and "C" are spaced apart from one another at progressively greater intervals advancing along the length of the channel 72 from the end of the channel proximate the inlet aperture 74 to the opposite end of the channel proximate the outlet aperture 76. That is, the space between groups "A" and "B" is less than the space between groups "B" and "C". In each group the spacing between the notches 68' is equal, however, the spacing between the notches is progressively greater in each succeeding group advancing along the length of the channel 72 from the end of the channel proximate the inlet aperture 74 to the opposite end of the channel proximate the outlet aperture 76. That is, the equal spacing between the notches 68' of group "A" is less than the equal spacing between the notches 68' of group "B", and the equal spacing between notches 68' of group "C".

Figure 15:
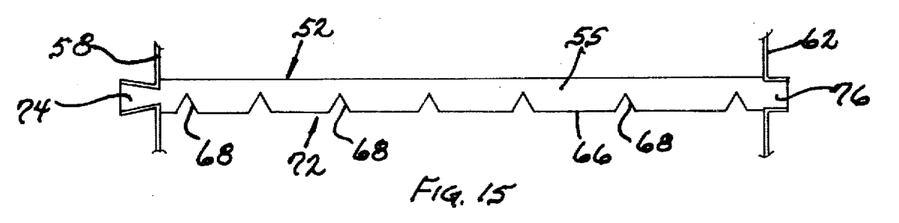
FIG. 15 is a longitudinal side view of a further advantageous embodiment of the present invention.

With reference to FIG. 15, a further advantageous embodiment of the gas treating material conveying channel 72 comprises a plurality of triangular shaped notches 68' formed in each longitudinal wall 53 and 55 of the elongated baffle plate 52. The notches of each wall 53 and 55 are spaced apart from one another at progressively increasing intervals along the length of the channel 72 from the end of the channel proximate the inlet aperture 74 to the opposite end of the channel proximate the outlet aperture 76. The notches 68' formed in longitudinal wall 53 are in alignment with corresponding notches 68' formed in longitudinal wall 55.

Figure 16:
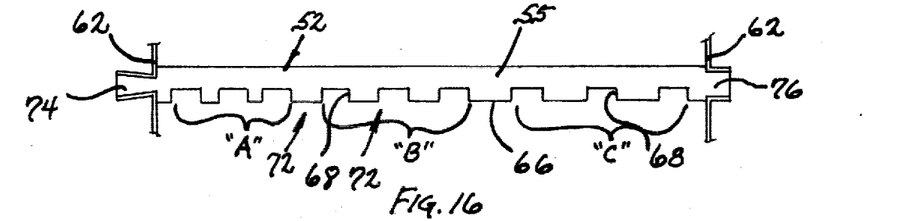
FIG. 16 is a longitudinal side view of yet a further advantageous embodiment of the present invention.

With reference to FIG. 16 yet a further advantageous embodiment of the gas treating material conveying channel 72, resembling the advantageous embodiment of FIGS. 12 and 14, illustrates a plurality of spaced apart groups, denoted for example as "A", "B", and "C", of rectangular shaped notches 68'' formed in the longitudinal wall 55 of the elongated baffle plate 52. It should be clearly understood that like notches 68'' are formed in the other longitudinal wall 53 of the elongated baffle plate and in alignment with corresponding notches 68'' formed in the longitudinal wall 55. This can be more clearly visualized in FIGS. 1, 6 and 11. The groups "A", "B", and "C" are spaced apart from one another at progressively greater intervals advancing along the length of the channel 72 from the end of the channel proximate the inlet aperture 74 to the opposite end of the channel proximate the outlet aperture 76. That is, the space between groups "A" and "B" is less than the space between groups "B" and "C". In each group the spacing between notches 68'' is equal, however, the spacing between notches is progressively greater in each succeeding group advancing along the length of the channel 72 from the end of the channel proximate the inlet aperture 74 to the opposite end of the channel proximate the outlet aperture 76. That is, the equal spacing between notches 68'' of group "A" is less than the equal spacing between notches 68'' of group "B", and the equal spacing between notches 68'' of group "B" is less than the equal spacing between the notches 68'' of group "C".

Figure 17:
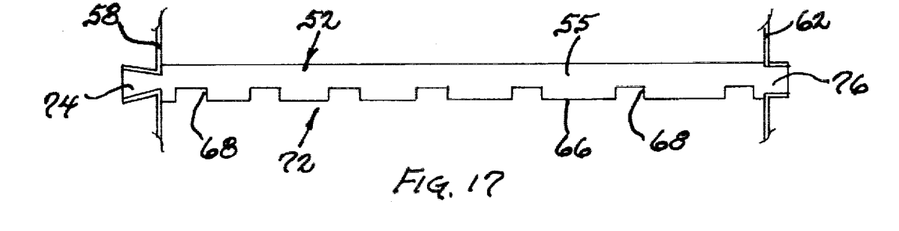
FIG. 17 is a longitudinal side view of still another advantageous embodiment of the present invention.

With reference to FIG. 17, still a further advantageous embodiment of the gas treating material conveying channel 72 of the present invention comprises a plurality of rectangular notches 68'' formed in each longitudinal wall 53 and 55 of the elongated baffle plate 52. The notches of each wall 53 and 55 are spaced apart from one another at progressively increasing intervals along the length of the channel 72 from the end of the channel proximate the inlet aperture 74 to the opposite end of the channel proximate the outlet aperture 76. The notches 68'' formed in the wall 53 are in alignment with corresponding notches 68'' formed in wall 55 of the elongated baffle plate 52.

While other peripherally shaped notches, such as for example arcuately shaped notches were not tested, it is conceivable that this shape would function in a similar manner to the triangular, trapezoidal or rectangular shaped notches. Therefore, arcuately shaped notches are considered as an equivalent to at least one of the shapes tested.

The gas treating material and conveying gas outlet aperture 76 is larger in area than the conveying gas inlet aperture 74 which contributes to a greater negative pressure being created in the gas treating material conveying channel 72 proximate the conveying gas inlet aperture 74 than at the other end of the gas treating material conveying channel 72 proximate the gas treating material and conveying gas outlet aperture 76. The conveying gas inlet aperture 74 is advantageously rectangular in peripheral shape, while the gas outlet aperture 76 is advantageously circular in peripheral shape; however, other shapes, such as oval, may be used.

Figures 6, 11:
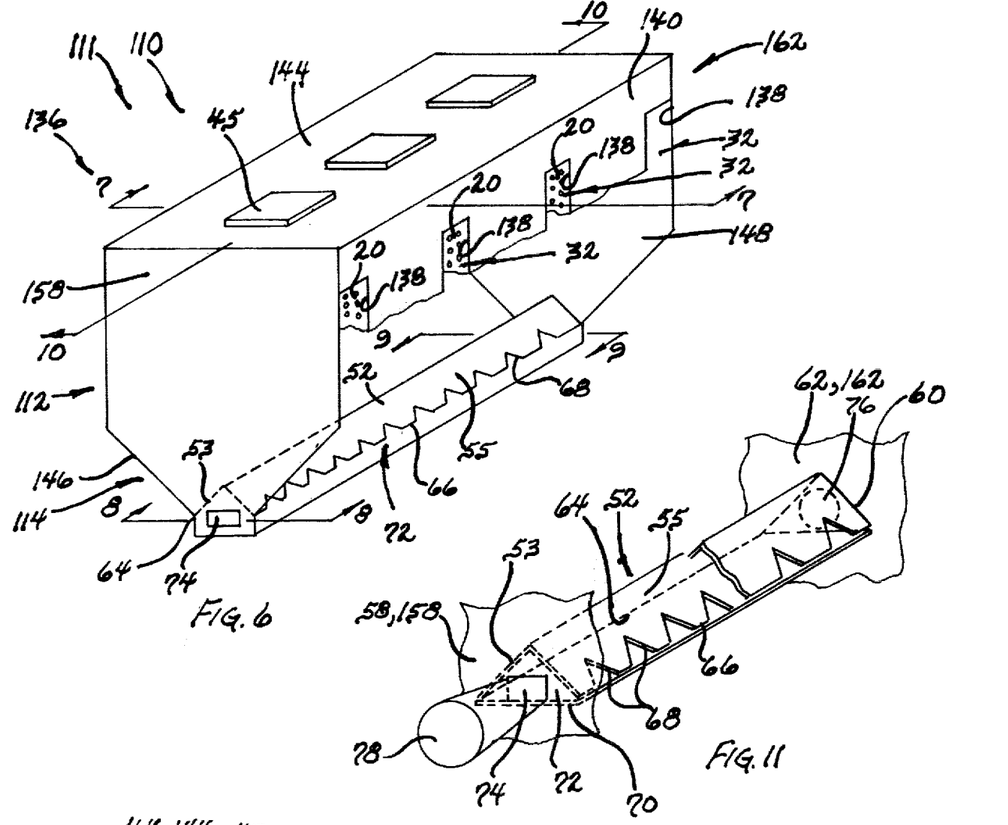
FIG. 6 is an isometric partially broken away view of another filter device incorporating the present invention.
FIG. 11 is an enlarged isometric fragmented view of the present invention.
Figure 10:
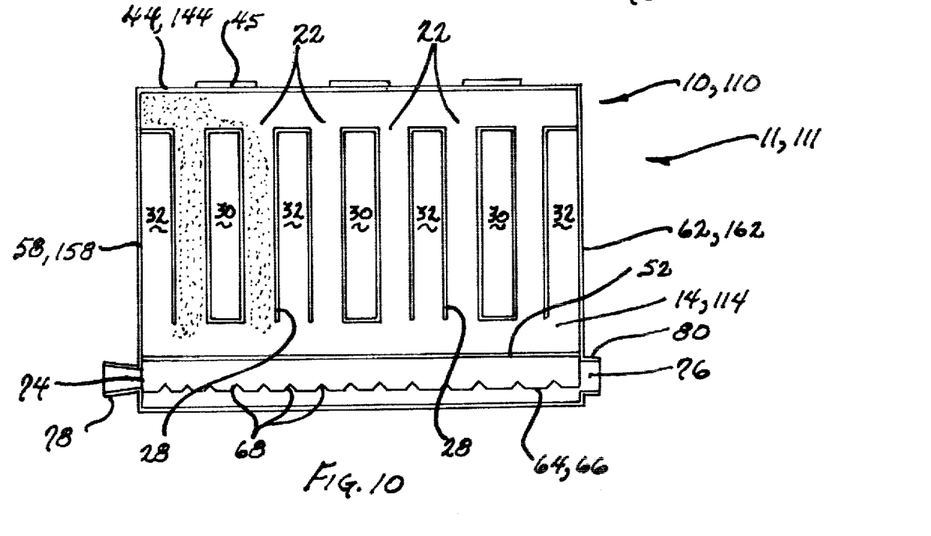
FIG. 10 is a longitudinal cross-section view taken in the direction of arrows 10—10 in FIG. 1 and arrows 10—10 in FIG. 6.

Now with reference to FIGS. 10 and 11, the conveying gas inlet aperture 74 comprises a converging nozzle 78, the conveying gas inlet aperture 74 being the outlet opening of the nozzle 78. The convergent nozzle 78 is fitted through an appropriate opening in the housing side wall 58 and is secured to the side wall 58, for example, by welding.

As can be seen in FIG. 10, a collar 80 can be fitted around the periphery of the gas treating and conveying outlet aperture 76 so that a pneumatic hose may be connected thereto.

Figure 7:
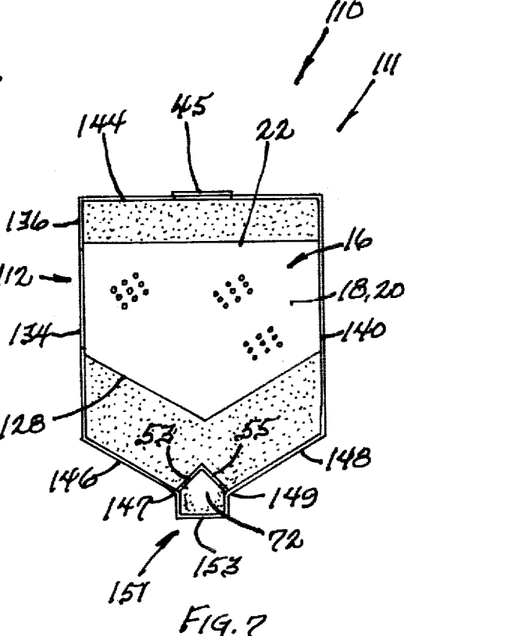
FIG. 7 is a transverse cross-sectional view taken in the direction of arrows 7—7 in FIG. 6.

FIGS. 6 and 7 illustrate another advantageous filter apparatus 110 which is also particularly suitable for use in the nuclear field for removing radioactive constituents from a gas stream. The filter apparatus 110 comprises a housing 111 with an upper gas treating enclosure portion 112 and a lower hopper portion 114 open to the gas treating enclosure portion 112.

A plurality of the filter cells 16 are disposed within the upper gas treating enclosure portion 112 in the same manner as they are in the filter apparatus 110 previously described, and likewise define the plurality of alternating dirty gas inlet passageways 30 and clean gas outlet passageways 32 therebetween.

The gas treating enclosure portion 112 of the filter apparatus 110 further comprises a plurality of dirty gas inlet apertures 134 formed in its upstream wall 136, each dirty gas inlet aperture 134 communicating with a different one of the dirty gas inlet passageways 30. Similarly, a plurality of clean gas outlet apertures 138 are formed in the downstream wall 140 of the gas treating enclosure portion 112, each clean gas outlet aperture 138 communicating with a different one of the clean gas outlet passageways 32.

As with filter apparatus 10, the filter apparatus 110 also includes means for charging or filling the filter cells 16 with fresh or uncontaminated particulate solid sorbent material. The charging means is illustrated for exemplary purposes as the plurality of openings 42 in the top wall 144 of the gas treating portion 112. Each opening 42 can be closed by a cover 45. Because the charging means does not comprise a part of the present invention, and because any one of a number of solid sorbent charging means may be used, it will not be further discussed.

With continued reference to FIGS. 6 and 7, the hopper portion 114 of the filter apparatus 110 has at least two of its facing walls 146 and 148 sloping downwardly toward each other from their points of attachment to the upstream wall 136 and downstream wall 140, respectively, of the gas treating enclosure portion 112. The sloping walls 146 and 148 each terminate at distal ends 147 and 149, respectively. Elongated trough means 151 having a generally rectangular shape in transverse cross-section is disposed between and connected to, or integrally formed with, the distal ends 147 and 149, i.e., those ends of the walls 146, 148 most remote from the ends of the walls 146,148 which are attached to the upstream wall 136 and downstream wall 140, respectively, of the gas treating enclosure portion 112,—of the sloping walls 146 and 148. Elongated trough means 151 is open to the interior of the hopper portion 114 and extends completely across the hopper portion from one side wall 158 of the filter housing 111 to the other side wall 162 of the filter housing 111 with the longitudinal axis of the elongated trough 151 being transverse to the planar foraminous surfaces 18 and 20 of the filter cells 16 disposed in the upper gas treating enclosure portion 112.

Still referring to FIGS. 6 and 7, channel defining means, such as the elongated baffle plate 52 is disposed within the trough 151 and cooperates with the walls of the trough 151 to define a gas treating material conveying channel 72. The elongated baffle plate 52 preferably has a chevron shape in transverse cross-section formed of two longitudinal walls 53 and 55 with the apex of the chevron projecting upwardly out of the trough 151 and toward the filter cells 16 located above it in the gas treating enclosure portion 112. The baffle 52 extends completely across the hopper portion 114, and therefore, the full length of the trough 151, and is attached at one of its ends 56 to one side wall 158 of the housing 11 and at the other of its ends 60 to the opposite side wall 162 of the housing 111. The longitudinal walls 53 and 55 of the baffle plate 52 terminate at longitudinal edges 64 and 66, respectively. The longitudinal edges 64 and 66 are generally parallel to each other. The longitudinal edge 64 of the baffle plate 52 abuts the wall of the trough 151 adjacent to it and the other longitudinal edge 66 of the elongated baffle plate 52 abuts the walls of the trough 151 adjacent to it. Each longitudinal wall 53 and 55 of the baffle plate 52 is formed with a plurality of notches 68 at intervals along the length of the elongated baffle plate 52. Preferably, each notch 68 formed in longitudinal wall 53 is open to the longitudinal edge 64 and, likewise, each notch 68 formed in the longitudinal wall 55 is open to the longitudinal edge 66. Thus, the gas treating material conveying channel 72 is open to, or communicates with the interior of the hopper portion 114 only at intervals along its length through the notches 68 formed in the elongated baffle plate 52.

It should be noted that the floor 153 of the trough 151 forms the floor of the gas treating material conveying channel 72, and is planar and disposed in a substantially horizontal plane. The floor 153 provides a smooth surface over which the granulated solid sorbent material can readily slide as it moves along the channel 72.

Figure 8:
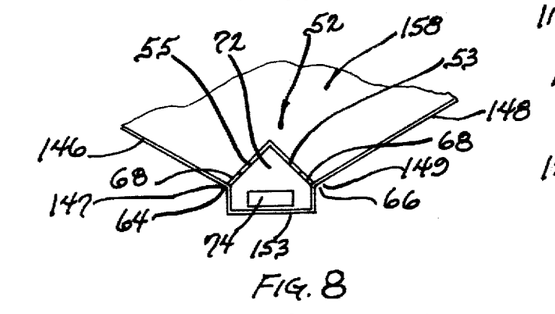
FIG. 8 is an enlarged segmented end view taken in the direction of arrows 8—8 in FIG. 6.
Figure 9:
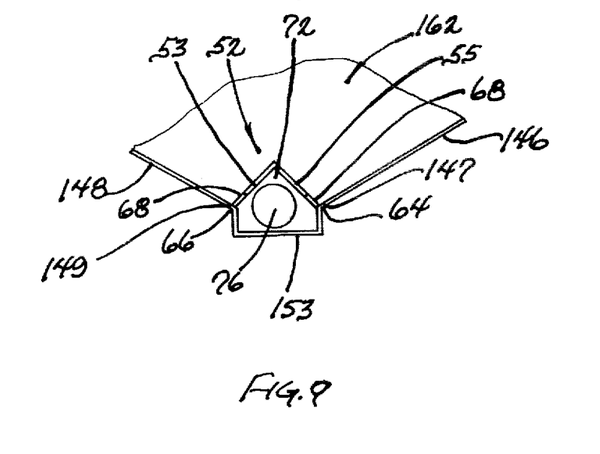
FIG. 9 is an enlarged segmented end view taken in the direction of arrows 9—9 in FIG. 6.

Now referring to FIGS. 6, 8, and 9, a conveying gas inlet aperture 74 is formed through the filter housing side wall 158 and opens into the gas treating material conveying channel at one of the ends of the channel. Similarly, a gas treating material and conveying gas outlet 76 is formed through the opposite filter housing side wall 162 and opens into the gas treating material conveying channel 72 at the other end of the channel 72.

The gas treating material and conveying gas outlet aperture 76 is larger in area than the conveying gas inlet aperture 74 so that a greater negative pressure is created in the gas treating material conveying channel 72 proximate the conveying gas inlet aperture 74 than at the other end of the gas treating material conveying channel 72 proximate the gas treating material and conveying gas outlet aperture 76. The conveying gas inlet aperture 74 is advantageously rectangular in peripheral shape and the outlet aperture 76 is advantageously circular in peripheral shape, however, other shapes, such as oval, may be used.

With reference again to FIGS. 10 and 11, as with the filter apparatus 10, the conveying gas inlet aperture 74 of the filter apparatus 110 comprises the converging nozzle 78, the conveying gas inlet aperture 74 being the outlet opening of the nozzle 78. The convergent nozzle 78 is fitted through an appropriate opening in the housing side wall 158 and is secured to the side wall 158, for example, by welding.

As can be seen in FIG. 10, a collar 80 can be fitted around the periphery of the gas treating material and conveying gas outlet aperture 76 so that a pneumatic hose may be connected thereto.

Figure 18:
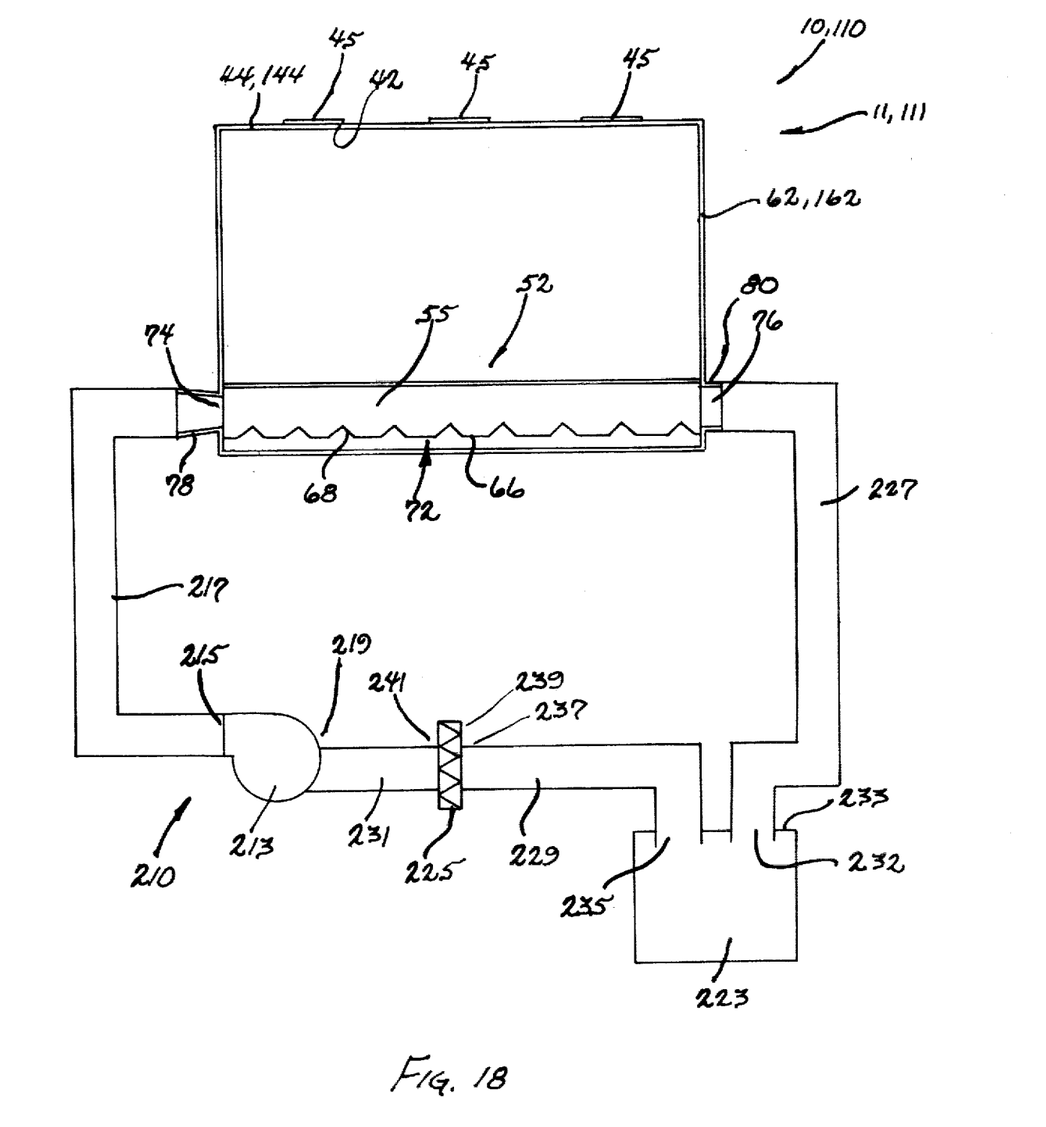
FIG. 18 is a schematic sketch of a filter housing incorporating the present invention operatively connected to a pneumatic conveying system.

Referring now to FIG. 18, there is shown a closed loop pneumatic gas treating material removing system, generally denoted as the numeral 210, which comprises either the gas filter apparatus 10 or 110. The closed loop pneumatic gas treating material removing system 210 also comprises a blower 213 having its outlet or pressure side 215, as a source of pressurized conveying gas, operatively connected to the conveying gas inlet aperture 74 into the gas treating material conveying channel 72 of the filter apparatus 10, 110 by means of, for example, a conveying gas conduit 217. The inlet or suction side 219 to the blower 213, as a suction source, is operatively connected to the gas treating material and conveying gas outlet 76 from the gas treating material conveying channel 72 of the filter apparatus 10, 110, by means of, for example, a conveying gas conduit 221. Interposed between the blower inlet 219, and the gas treating material and conveying gas outlet 76 in the conveying gas conduit 221 is a gas treating material separator and reservoir device 223 for separating the contaminated gas treating material, and at least one high efficiency gas filter device 225.

The conveying gas conduit 221 is comprised of three sections: 227, 229, and 231. The first section 227 connects the gas treating material and conveying gas outlet aperture 76 with the separator and reservoir device 223. The end 232 of the first section 227 of the conduit 221 which is connected to the separator and reservoir device 223 projects downwardly through the top 233 of the separator and reservoir device 223 a short distance into its interior. The second conduit section 229 interconnects the separator and reservoir device 223 with the gas filter device 225. The end 235 of the conduit section 229 connected to the separator and reservoir device 223 also projects downwardly through the top 233 a short distance into its interior. The other end 237 of the second conduit section 229 terminates at the upstream side 239 of the gas filter device 225. The third conduit section 231 interconnects the downstream side 241 of the filter device 225 and the low pressure inlet 219 of the blower 213.

In operation, in order to evacuate or remove contaminated solid sorbent gas treating material (indicated by the mottling in the various figures) from the filter housing 11, 111 the blower 213 is actuated to provide a flow of high pressure conveying gas, in this instance, air. This flow of high pressure air is conveyed through the conveying gas inlet aperture 74 and into the gas treating material conveying channel 72. As the conveying gas stream passes through the converging nozzle 78 and into the channel 72, it is accelerated. As the conveying gas stream flows through the channel 72 to the gas treating material and conveying gas outlet aperture 76 it causes the solid sorbent gas treating material in the hopper portion 14, 114 to be aspirated through the notches 68 and into the conveying channel 72 first at the end of the channel proximate the conveying gas inlet aperuter 74, and then progressing along the entire length of the channel 72 toward the gas treating material and gas conveying aperture 76. The accelerated conveying gas stream in the channel 72 proximate the conveying gas inlet aperture 74 causes a part of the static gas pressure at this point to be converted into velocity pressure thereby increasing the negative static pressure. Therefore, there is a greater negative static pressure in the channel 72 proximate the conveying gas inlet aperture 74 than there is toward the other end of the channel 72 proximate the gas treating material and gas conveying outlet aperture 76, and this causes the hopper portion 14, 114 to be emptied from the end of the channel 72 proximate the conveying gas inlet aperture 74 first. If the negative static pressure in the channel 72 was constant along its length, or if the negative static pressure in the channel proximate the gas treating material and gas conveying outlet aperture 76 was greater than the negative static pressure proximate the conveying gas inlet aperture 74, solid sorbent gas treating material would aspirate into the channel 72 first proximate the outlet aperture 76 but would not progressively aspirate into the channel 72 toward the inlet aperture 74 and the blower 213 could merely draw air instead. The gas treating material within the channel 72 is carried by the conveying gas stream out of the channel 72 through the gas treating material and conveying gas outlet aperture 76 due to the suction in the conveying gas conduit 221 due to the fact that the conveying gas conduit section 231 is interconnected to the suction side 219 of the blower 213. The conveying gas and gas treating material passes through the first conduit section 227 to the gas material separator and reservoir device 223. The gas borne gas treating material exits the first conduit section 227 through its downwardly projecting open end 232 into the interior of the separator and reservoir 223. Because the open end 235 of the second conduit section 229 is covered with a particulate matter separating material (not shown) essentially all of the solid sorbent gas treating material is separated out of the conveying gas stream. The conveying gas stream, now relatively free of solid sorbent gas treating material, passes through the second conduit section 229 to the upstream side 239 of the gas filter device 225, and through the gas filter device 225 from its upstream side 239 to its downstream side 241 wherein any residual gas treating material is separated from the conveying gas stream. Upon leaving the downstream side 241 of the filter device 255 the conveying gas enters the third conduit section 231 and passes there along to the inlet or suction side 219 of the blower 213 wherefrom it is recirculated through the pneumatic conveying system 210.

When the gas treating material separator and reservoir 223 becomes full of separated gas treating material, the blower 213 is temporarily deactivated. The top 233 is removed from the separator reservoir 233 which is then removed from the pneumatic conveying system 210 and disposed of. An empty separator and reservoir device 223 is put in place of the removed full one and the top 233 is put in place over the empty separator and reservoir device 223. The blower is reactivated and the above described process is continued.

The foregoing detailed description is given primarily for clearness of understanding and no unnecessary limitations should be understood therefrom or modifications will be obvious to those skilled in the art upon reading this disclosure and may be made without departing from the spirit of the invention or the scope of the appended claims.

What is claimed is:

1. A filter apparatus comprising:
   (a) filter housing including
      (1) a gas treating enclosure portion having dirty gas inlet means and clean gas outlet means; and
      (2) a hopper portion disposed below and open to the gas treating portion having at least two facing walls sloping downwardly toward each other;
   (b) means defining a plurality of filter cells containing a granulated gas filtering material, each of said filter cells being disposed within the gas treating enclosure portion of the filter housing between the dirty gas inlet means and the clean gas outlet means and being open to the hopper portion of the filter housing so that granulated gas filtering material will fall into the hopper portion of the filter housing;
   (c) an elongated baffle plate spaced above the juncture of the sloping walls of the hopper portion to define a gas filtering material conveying channel for a conveying gas stream adapted to draw granulated filtering material from the interior of the hopper portion and carry it from the filter housing during filter cleaning operations, said conveying channel being within and extending completely across the hopper portion proximate the bottom of the filter housing;

(d) a conveying gas inlet aperture in one wall of the hopper portion of the filter housing opening into the conveying channel at one end of the channel;

(e) a gas outlet aperture for the conveying gas and the gas filtering material opening into the conveying channel through the wall of the hopper portion of the filter housing at the opposite end of the conveying channel;

(f) a plurality of notches formed in said elongated baffle plate adapted to accommodate the flow of granulated filtering material from the interior of the hopper portion into the conveying channel; and (g) a predetermined number of said notches being spaced apart along the length of the conveying channel at progressively increasing intervals starting proximate the gas inlet aperture to minimize cavitation in the granulated filtering material during filter cleaning operations.

2. The filter apparatus of claim 1, wherein the plurality of notches are arranged into a plurality of spaced apart groups, each group having a plurality of equally spaced apart notches including one of said predetermined notches, and said groups of notches being spaced apart from one another longitudinally of the channel at progressively greater intervals advancing along the length of the channel from the end of the channel proximate the inlet aperture toward the opposite end of the channel proximate the outlet aperture.

3. The filter apparatus of claim 2, wherein the spacing between the notches of each succeeding group of notches is progressively greater advancing along the length of the channel from the end of the channel proximate the inlet aperture toward the opposite end of the channel proximate the outlet aperture.

4. The filter apparatus of claim 1, wherein the plurality of notches have a substantially trapezoidal peripheral shape.

5. The filter apparatus of claim 1, wherein the plurality of notches have a substantially triangular peripheral shape.

6. The filter apparatus of claim 1, wherein the plurality of notches have a substantially rectangular peripheral shape.

7. The filter apparatus of claim 1, wherein the floor of the channel is substantially horizontally disposed and substantially planar.

* * * * *